United States Patent [19]
Natkai et al.

[11] 3,867,868
[45] Feb. 25, 1975

[54] APPARATUS FOR THE MACHINING OF CYCLOIDAL SURFACES

[75] Inventors: Lajos Natkai, Budapest; Janos Lenkefi, Nagykanizsa, both of Hungary

[73] Assignee: Orszagos Koolaj- es Gazipari Troszt, Budapest, Hungary

[22] Filed: May 14, 1973

[21] Appl. No.: 360,199

[52] U.S. Cl. ............... 90/20, 51/105 R, 51/DIG. 32
[51] Int. Cl. ............................ B23c 3/04, B24b 5/00
[58] Field of Search ...... 51/DIG. 32, 105 R; 408/54; 82/1.3; 90/20, 30, 32, 11 C

[56] References Cited
FOREIGN PATENTS OR APPLICATIONS
1,239,213  4/1967  Germany ...................... 51/DIG. 32

*Primary Examiner*—Gil Weidenfeld
*Attorney, Agent, or Firm*—Karl F. Ross; Herbert Dubno

[57] ABSTRACT

Cycloidal surfaces can be machined in a workpiece by displacing the latter relative to a chip-removal tool having a stationary axis, by mounting the workpiece upon the rotatable shaft of a tool holder, the shaft axis being displaced on a pivotal arm which is articulated to a crank centered on the tool axis. A gear train rotates the workpiece about the holder axis at a rate determined by the angular displacement of the arm, one end of which is guided along a linear path aligned with the tool axis. As a result high-precision single or multi-cuspid cycloidal configurations can be formed in the workpiece without the use of a template or master.

4 Claims, 8 Drawing Figures

APPARATUS FOR THE MACHINING OF CYCLOIDAL SURFACES

FIELD OF THE INVENTION

The present invention relats to a method of and to an apparatus for the formation of polycuspid or single-cusp cycloidal surfaces in a workpiece and, more particularly to the formation of epicycloidal, hypocycloidal and ellipsoidal cylindrical surfaces in bodies, preferably of metal, by a material-removal operation.

BACKGROUND OF THE INVENTION

Cylindrical surfaces (i.e., surfaces defined by a straight-line generatrix displaced parallel to itself along a curved path lying in a plane perpendicular to the axis of the body and to the generatrix), may be of a cycloidal nature, i.e., may conform to part of a cusp or lobe, an entire cusp or lobe, or a plurality of cusps or lobes of an epicycloid or hypocycloid. Workpieces having such surfaces are used in many applications, e.g. as cams of the slave, external or internal type, and wherever chambers of the requisite configurations are required. For example, epicycloidally cylindrical internal surfaces may be used for Wankel or like internal combustion engine chambers and external epicycloidal surfaces may be used for the rotors thereof. Ellipsoidal cylinders, in which individual portions of the cylindrical surface correspond to epicycloidal surfaces are also employed in engines, turbines and the like, for example in the stators or rotors in hydraulic (water-power) machines and as turbine vanes, blades or the like.

The manufacture of workpieces having such surfaces has been difficult and highly expensive. For example, casting techniques are seldom satisfactory for many materials which are required to have the epicycloidal, ellipsoidal or hypocycloidal surfaces, generally designated as "cycloidal cylindrical surfaces" whether they correspond to all or a portion of an epicyloid, an ellipsoid or hypocycloid. Conventional apparatus for making workpieces having such surfaces have made use of so-called pattern-copying techniques in which a template, model or pattern is engaged by a feeler which controls the motion of a machining tool (e.g. a milling head or hobbing tool, grinder or the like rotatable about a tool axis) whereby the tool and the feeler describe identical contours and the workpiece is shaped to correspond to the contours of the template or pattern. More complex systems make use of turret assemblies in which different tools are brought into a play to machine different parts of the workpiece according to predetermined patterns, and electronic or numerical-control equipment in which the workpiece and/or the tool is incrementally displaced in accordance with data previously recorded or designed to bring about the desired configuration.

For the most part, the aforedescribed apparatuses for machining cycloidal cylindrical surfaces in a workpiece have the disadvantage that they are imprecise, require preliminary formation of a master or pattern, and effect engagement between the workpiece and the tool with changing angles of attack so that uniform machining is precluded. In practice, the conventional techniques can only form a limited number of curves, are restricted in the size of the curve which can be formed and are incapable of adjustment to epicycloids and hypocycloids of different parameters (i.e., are of limited versatility). Programmed machines of the type described have the further disadvantage that the establishment of the program is costly and complex, and nevertheless may require the preparation of a master.

OBJECTS OF THE INVENTION

It is the principal object of the present invention, therefore, to provide an improved method of and an apparatus for the machining of cylindrical cycloidal surfaces whereby the aforementioned disadvantages are obviated.

It is another object of this invention to provide a method of and an apparatus for the formation of epicycloidal, ellipsoidal and hypocycloidal surface portions in a workpiece wherein the angle of attack of the machining tool may be held constant, whereby the prior development of complex programs or manufacture of templates or patterns is unnecessary, and wherein the surface formed is of great precision and accuracy.

Another object of the invention is to provide a relatively simple apparatus for the production of epicycloidal, ellipsoidal and hypocycloidal surfaces which is of economical construction and yet high accuracy.

SUMMARY OF THE INVENTION

These objects and others which will become apparent hereinafter are attained, in accordance with the present invention, by providing a fixed machining site or stationary axis of rotation for a material-removal tool (which is preferably rotatable about this axis) and by mounting a workpiece holder upon a shaft carried by an arm which is guided at one location along its length along a rectilinear path fixed with respect to the tool axis while translating the angular displacement of this arm about a pivot axis thereof into angular displacement of the workpiece-holder shaft by a gear transmission carried by the arm. The latter is displaced about its pivot axis by a crank which preferably is centered upon the tool axis.

The present invention is based upon the recognition that an external cycloid having $n$ cups or lobes can be described in terms of a point on the circumference of a circle (osculating circle) having the radius $r_1$ and osculating externally a base circle of the radius $R$ where $r_1 = 1/n\ R$. Similarly, cycloidal surfaces can be defined by using an internal osculating or generating circle of radius $r_2$ where $r_2 = (n + 1/n)R$, the epicycloid having $n$ arcuate surfaces.

A hypocycloid having $n$ arcs can be defined by a point on a circle internally osculating the base circle $R$ such that the radius $r_3$ or $r_4$ of the internal osculating circle are defined by $r_3 = 1/n\ R$, $R$ or $r_4 = (n - 1/n)R$. In all of the foregoing $n$, of course, represents a whole number.

Each point of the osculating or generating circle, including the point which generates the cycloid, rotates about a former contact point of the osculating circle with the staionary base circle, this contact point serving as a center of moments. Thus the line joining these points extends perpendicular to the direction of displacement of the generating circle in the plane of the base circle on the cycloid.

From the foregoing it will be apparent that the generation of a cycloidal surface requires the rotation of the generating or osculating surface about its axis with one point in contact with a stationary or base circle so that the axis of the generating circle will describe a path within or outside the base circle and a point on the periphery of the generating or osculating surface will describe a cycloidal figure. For the purposes of the present invention, four points must be considered, namely, the center of moments of the osculating and base circle, the point of contact of the tool with the workpiece, the center of the osculating circle and the center of the base circle.

We have found that it is possible, by providing a workpiece which is rotatable about its axis on a swingable member guided linearly at one of its pivots, to transform the relative motions of these points into one which allows the point of contact of the tool with the workpiece to be fixed. More particularly, the center of moments of the system, according to the present invention, is guided linearly along a path which is fixed with respect to the point of contact of the workpiece and the tool while the aforementioned axes or centers of the osculating circle and the base circle are spaced along the swingable member and the workpiece is rotatably mounted at one of these centers while a crank is articulated at the other center and rotates, in turn, about an axis at the point of contact mentioned earlier. As a result, the angular displacement of the swingable member can be translated into an angular displacement of the workpiece at a predetermined ratio designed to maintain the point of attack of the tool upon the workpiece perpendicular to a tangent to the surface to be machined therein. Where the center of moments is represented at B, the axis of the base circle as O, the axis of the osculating surface as A and the point of contact of the tool with the workpiece (and the axis of the crank) as P, the angular displacement $\omega_2$ of the pivotal member will be in a ratio to the angular displacement $\omega_1$ of the crank arm (centered on point P) equal to the ratio between the length of line $\overline{BA}$ to the length $\overline{BO}$, where $\overline{BA}$ and $\overline{BO}$ represent the straight line distance between point B and axis A and between point B and axis O, respectively, as measured in a plane of the base circle.

According to the invention, the cutting tool engages the workpiece at the point P and, as the workpiece rotated on the swingable member and the latter is pivoted about point B on the slide, a cycloidally cylindrical surface is formed in the workpiece and the line connecting the center of rotation of the tool and the center of the workpiece is always perpendicular to a tangent to the surface and hence the cutting action always takes place perpendicular to the surface with a constant angle of attack.

According to another feature of the invention, the radius of the tool is smaller than the smallest radius of curvature of the cycloidal surface to be produced and the tool is a grinding tool or is provided with cutting ribs or teeth. Of course, when the workpiece is driven at a high rate of speed, the tool may even be fixed. Preferably, however, the crank is driven by a main propulsion system and the tool is rotatable by an auxiliary drive mechanism coupled with the main drive for effecting the workpiece cutting operation.

DESCRIPTION OF THE DRAWING

The above and other objects, features and advantages of the present invention will become more readily more apparent from the following description, reference being made to the accompanying drawing in which:

FIG. 2b is a view similar to FIG. 1b showing the machining of a workpiece to provide the surface of FIG. 2a;

FIG. 3b is a section taken along the line A—A of FIG. 3a;

FIG. 4b is a section taken along the line B—B of FIG. 4a.

SPECIFIC DESCRIPTION

Figure 1B:
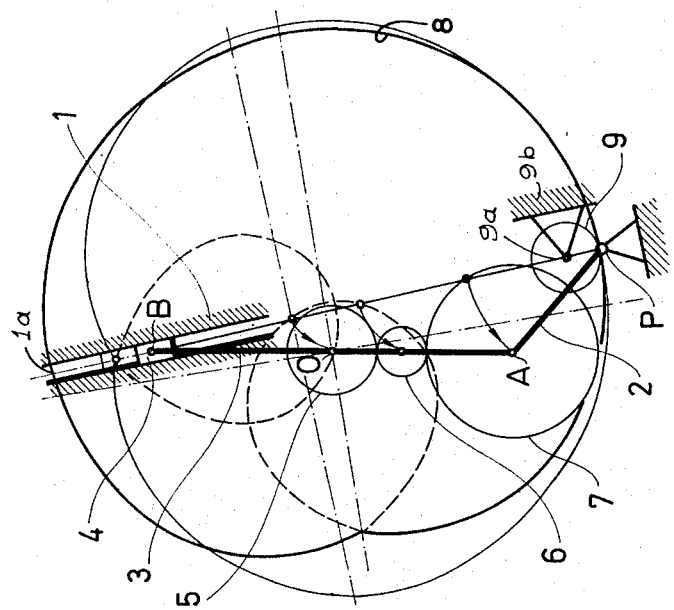
FIG. 1b is a diagram illustrating the machining of a workpiece to provide such an epicycloid.
Figure 1A:
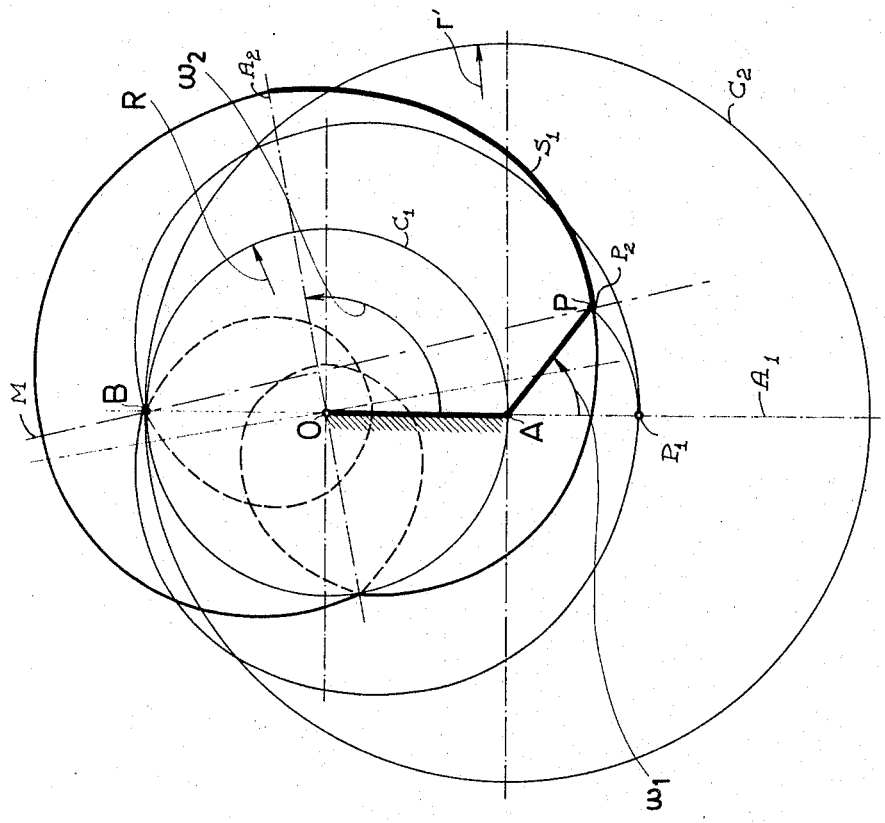
FIG. 1a is a diagram showing the development of an epicycloid having one cusp according to the invention.

FIG. 1 shows a system in which the base circle $C_1$ has a radius R as measured from its center O while the osculating circle $C_2$ has a radius $r'$ as measured from its center A. The point P represents the generatrix of the cycloidal curve while point B represents the center of moments of the system as described previously. The system of FIG. 1a generates a single-cusp epicycloid and in accordance with the principles set forth previously, $r = 2R$, the osculating circle $C_2$ of radius $r'$ contacting the base circle internally at B.

The point P of the osculating circle $C_2$ moves from its original location $P_1$ to the point $P_2$ as the axis $A_1$ of the epicycloid moves into the position shown at $A_2$, thereby describing the heavy-line epicycloidal segment $S_1$. The line $\overline{PA}$ thus swings through an angle $\omega_1$ while the axis $A_1$ swings through the angle $\omega_2$. A is the center of the generating or osculating circle while O is the center of the stationary or base circle C. The result of this generation of the epicyloid is a rotation of the point P about the point B serving as the center of moments so that the line M (represented by $\overline{BP}$) lies at point $P_1$ perpendicular to the direction of relative movement of the point P. To maintain this perpendicularity, the workpiece must be rotated through an equivalent angle about the axis A if machining is to take place with the angle of attack unchanged.

It will be appreciated that, when machining is referred to herein, any type of material removal technique can be used. Preferably a tool is employed for mechanical removal of material from the workpiece, e.g. by rotation of the tool about an axis parallel to the point P and along the line $\overline{BP}$. Typical tools for this purpose are grinding wheels, milling heads, routers, hubbers and polishing wheels.

In FIG. 1b we show the principles of FIG. 1a as applied in the present invention. The apparatus comprises a fixed base plate 1 which is formed with a guide channel 1a and a crank 2 swingable about the axis P so that the guide channel 1a and the fixed axis P are aligned, the channel 1a defining the path of the center of moments B. In this embodiment the point P corresponds to the point of attack of a machining tool 9 which is rotatable about an axis 9a fixed at 9b to the base plate 1. The arm 2 of the crank is articulated at A to an arm 3 which is pivotally connected at axis B to a slide block 4 shiftable in the channel 1a. The workpiece is held on a shaft journaled in the arm or member 3 for rotation about axis A and provided with a driven gear 7 in mesh with a motion-transmitting gear 6, the latter, in turn, engaging a gear 5 responding to the angular displacement of the arm 3. The gearing is so dimensioned that the angular displacement of the workpiece 8 (and hence the gear 7), represented by the angular velocity $\omega_2$ is defined by the relation $\overline{BM}/\overline{BO}\ \omega_1 = \omega_2$. In this relation $\omega_1$ is the angular velocity of the member 3. The material-removal tool 9 attacks the path of the cycloid at point P and, since its center coincides with the lines $\overline{PB}$, the workpiece is engaged at the point P at a tangent in common to the cycloid profile and the periphery of the cylindrical tool.

Figure 2B:
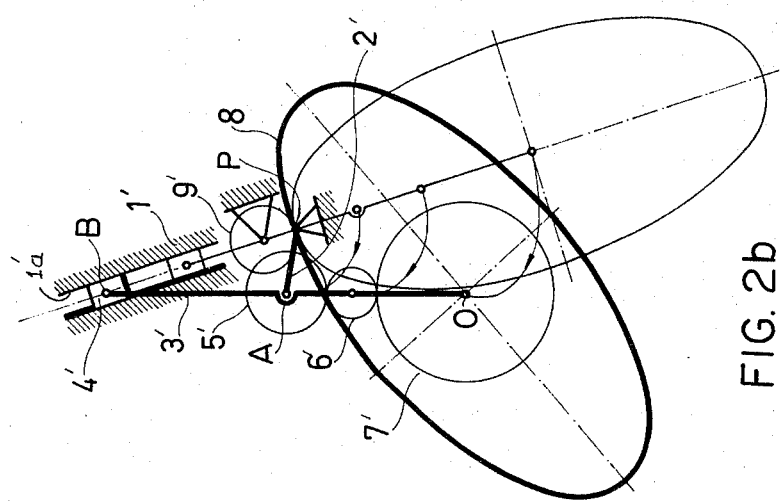
Figure 2A:
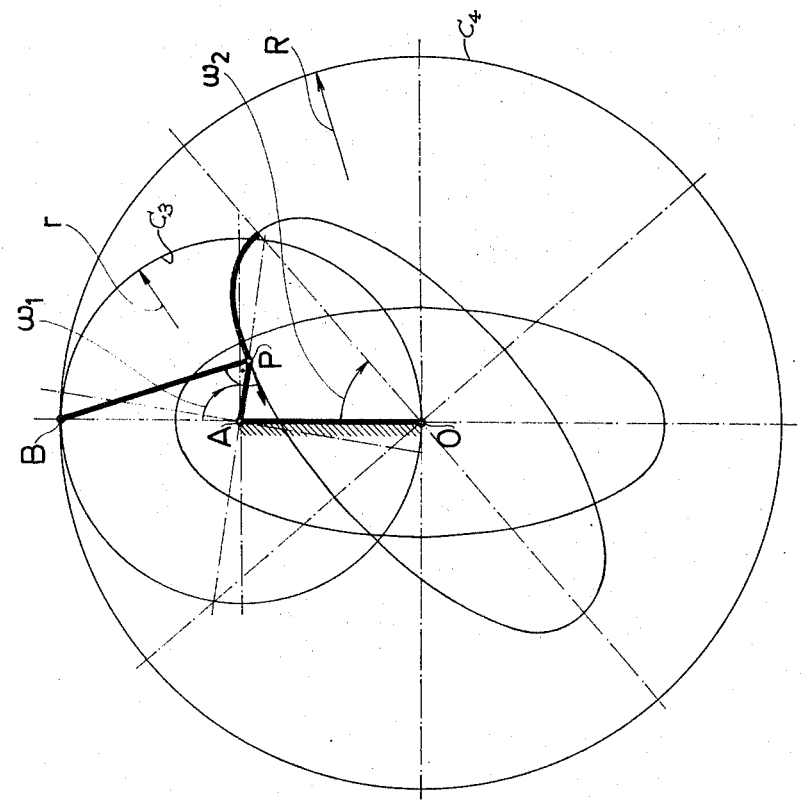
FIG. 2a is a diagram showing the development of an ellipsoid according to the invention.

In FIG. 2a, the same reference characters are used to refer to the various portions of the diagram, it being noted that here the internal osculating circle $C_3$ has a smaller radius $r$ than the radius $R$ of the base circle $C_4$. In the embodiment shown, the radius $r$ of the osculating circle is less than that of the base circle, and, in accordance with the relationships described, an ellipsoid is produced. In the system of FIG. 2b, the workpiece 8 is rotated by a gear $7^1$ upon the swingable member $3^1$ which is pivoted at the axis B in a slide block $4^1$ so as to move along he channel $1a^1$ of the base plate $1^1$. The crank $2^1$ here is articulated to the member $3^1$ in the axis A of gear $5^1$ so that the motion of this gear $5^1$ is transmitted to the gear $7^1$. The tool $9^1$ engages the workpiece 8 at a point P lying along a line connecting the axis of the tool, the axis B, and an axis of the channel $1a^1$.

Referring to FIGS. 1b and 2b, it will be apparent that the principles of this invention require that the pivotal member 3 be swingable about a point B constituting the center of moments of the osculating and base circles, that the point B be permitted to slide linearly along a fixed path aligned with the point P of contact between the tool and the workpiece, whether this contact is internal or external, that the axes O and A of the base and osculating circles be spaced apart in a line with point B along the member 3, that the crank 2 be centered upon the point P and articulated to the member 3 at one of the axes O, A, that the workpiece be journaled on the member 3 for rotation about the other of these axes and that a gear transmission be provided including at least two gear wheels journaled at the aforementioned axes and interconnected to impart angular displacement to the workpiece relative to the pivotal member in a predetermined ratio to the angular displacement of the member, this ratio being a function of the distance between the center of moments and the two axes.

Figure 3A:
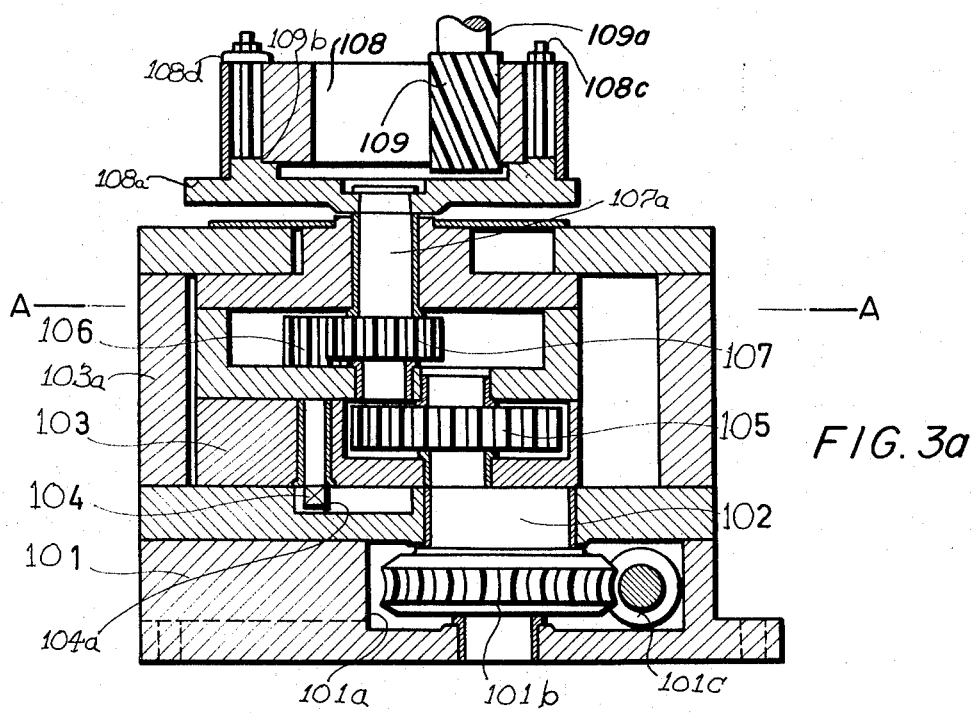
FIG. 3a is an axial cross-sectional view through an apparatus for machining a workpiece internally to provide a cycloidal surface.
Figure 3B:
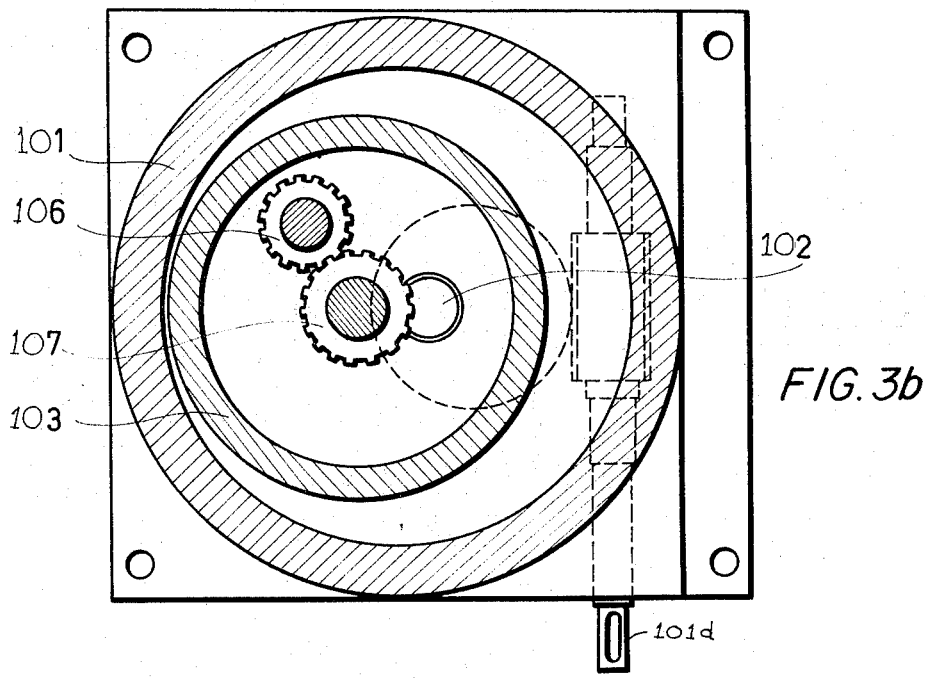

In FIGS. 3a and 3b, we show a device for the machining of a cylindrical surface for a single-cusp ellipsoid, e.g. of the type described in connection with FIGS. 1a and 1b. In this embodiment, the tool is shown to be a milling cutter 109 whose shaft 109a extends upwardly and is engaged by a motor for rotation independently from the displacement of the workpiece, although this mtor may be connected to the workpiece drive by any external transmission as may be required. The elements of FIGS. 3a and 3b which correspond to those of FIGS. 1a and 1b use the same reference numerals in a hundreds series.

The base plate 101 is provided with a chamber 101a receiving a worm wheel 101b in mesh with a worm 101c, the shaft 101d of which may be connected to the transmission driving the milling cutter 109. The worm wheel 101b is formed with a crankshaft 102. A slider 104 is guided in the plate 101 in a slot 104a which is analogous to the guide 1a previously described. The slot is perpendicular to the axis of the crankshaft 102. The slide 104 carries the swingable member 103 which is here shown to have a disk-shaped configuration and to be received within a housing 103a surmounting the base plate 1. The member 103 is, as previously described, swingable about an axis guided within the slot 104a and is articulated to the crankshaft 102 so as to be displaced by the latter as the crankshaft is rotated.

A gear 105 is keyed to the crankshaft 102 and meshes with a direction-changing gear 106 which, in turn, meshes with the gear 107 likewise journaled in the member 103 and having a shaft 107a carrying the workpiece mounting plate 108a upon which the workpiece 108 is affixed. Here the workpiece 108 is a ring which is received within an annular step 108b and is held against this step in the axial direction by tension bolts 108c engaging the plates 108d.

In operation, of course, the device performs the relative motions described in connection with FIGS. 1a and 1b. The gears 105 – 107 translate the angular displacement of the crank into the requisite rotation of the workpiece.

Figure 4A:
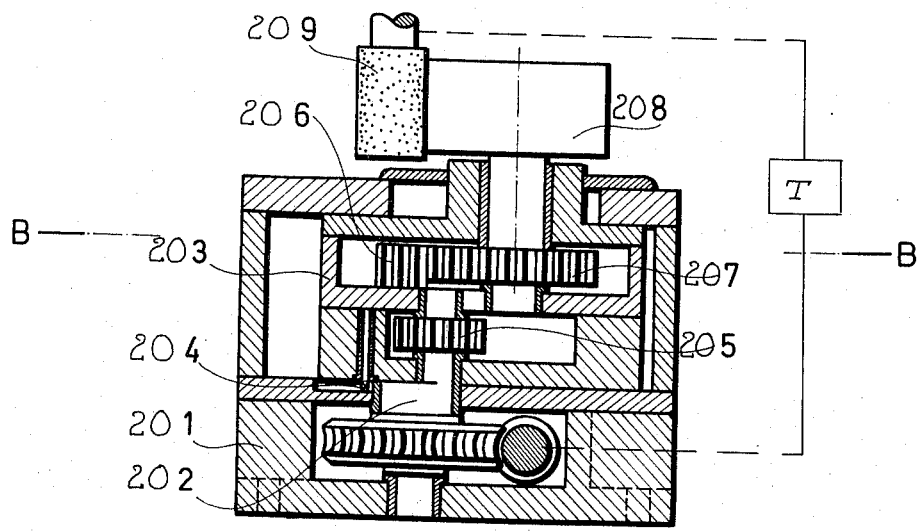
FIG. 4a is an axial section through an apparatus for the machining of a workpiece according to the invention.
Figure 4B:
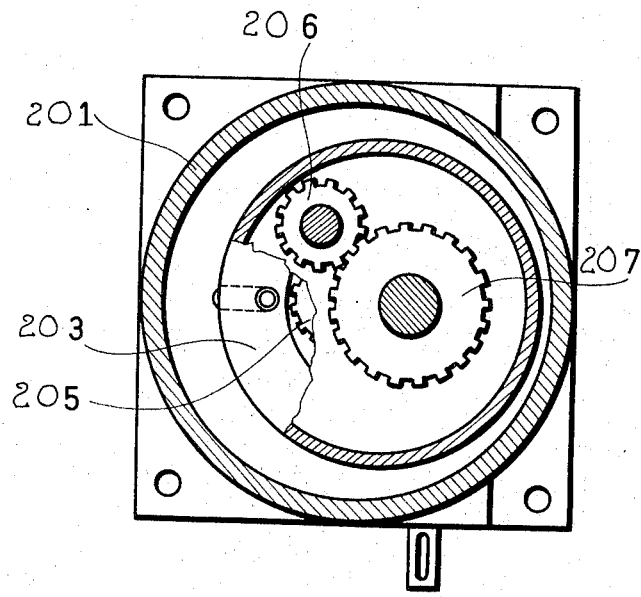

In the system of FIGS. 4a and 4b, wherein similar reference numerals are used to indicate similar parts, the tool 209 is a grindstone and the workpiece 208 is machined along its exterior surface. Otherwise the elements 201 – 207 perform the same functions as elements 1 – 7, respectively, described in connection with FIGS. 2a and 2b. The system of FIG. 4 is also shown to be provided with a transmission T connecting the tool 209 to the principal drive.

We claim:

1. An apparatus for the machining of a cycloidal workpiece to impart thereto the configuration of a cycloid defined by rotating an osculating circle in contact with a base circle, said circles having respective axes and different radii and together defining a center of moments, the smaller raduis circle lying within the larger radius circle, said apparatus comprising:
   a tool engageable with said workpiece at a machining location;
   a pivotal member having a pivot at said center;
   means for guiding said pivot in a linear path fixed with respect to said location and aligned therewith;
   a crank centered on said location and articulated to said member at one of said axes;
   means mounting said workpiece for rotation about the other of said axes;
   meshing gear means for rotating said mounting means about said other of said axes at a fixed ratio to the pivotal displacement of said crank,
   drive means operatively connected to said crank for rotating same about an axis aligned with said location, said tool being rotatable and having a radius less than the smallest radius of curvature of the cycloidal surface to be generated in said workpiece and smaller than either of said radii, and said tool being rotatable about an axis disposed upon a line connecting said path and said location but offset from said one of said axes.

2. The apparatus defined in claim 1, further comprising means for synchronously connecting both said drive means.

3. The apparatus defined in claim 1 wherein said rotating means includes a gear operatively connected to said mounting means, and at least one further gear rotatably mounted on said member.

4. The apparatus defined in claim 3 wherein said rotating means includes a further gear keyed to said crank.

* * * * *